(12) United States Patent
Desimone

(10) Patent No.: US 9,999,200 B1
(45) Date of Patent: Jun. 19, 2018

(54) DOG WASTE COLLECTION DEVICE

(71) Applicant: Mariano Desimone, Boca Raton, FL (US)

(72) Inventor: Mariano Desimone, Boca Raton, FL (US)

( * ) Notice: Subject to any disclaimer, the term of this patent is extended or adjusted under 35 U.S.C. 154(b) by 0 days. days.

(21) Appl. No.: 15/727,187

(22) Filed: Oct. 6, 2017

(51) Int. Cl.
*A01K 29/00* (2006.01)
*A01K 23/00* (2006.01)

(52) U.S. Cl.
CPC .................................. *A01K 23/005* (2013.01)

(58) Field of Classification Search
CPC ...... A01K 23/005; A01K 1/01; E01H 1/1206; E01H 2001/122; E01H 2001/128; E01H 2001/1226
USPC ............................................ 294/1.4, 1.3, 1.5
See application file for complete search history.

(56) References Cited

U.S. PATENT DOCUMENTS

| | | | | |
|---|---|---|---|---|
| 3,711,141 A | * | 1/1973 | Soergel | A47L 13/52 |
| | | | | 15/257.8 |
| 3,984,139 A | * | 10/1976 | Battaglia | E01H 1/1206 |
| | | | | 294/1.4 |
| 4,335,678 A | * | 6/1982 | Garza | A01K 23/005 |
| | | | | 294/1.5 |
| 6,123,046 A | * | 9/2000 | Gemeniano | E01H 1/1206 |
| | | | | 119/161 |
| 6,386,606 B1 | * | 5/2002 | Marshall | A01K 23/005 |
| | | | | 15/257.4 |
| 7,431,361 B2 | * | 10/2008 | Pilas | A01K 23/005 |
| | | | | 294/1.5 |
| 8,146,967 B1 | * | 4/2012 | Brown | A01K 23/005 |
| | | | | 294/1.5 |
| 8,684,429 B1 | * | 4/2014 | Holub | E01H 1/1206 |
| | | | | 294/1.4 |
| 9,072,280 B1 | * | 7/2015 | Ramoutar | A01K 23/005 |
| 9,228,307 B2 | * | 1/2016 | Dixit | E01H 1/1206 |
| 9,756,836 B2 | | 9/2017 | Coba | |
| 2003/0085581 A1 | * | 5/2003 | Jemison | E01H 1/1206 |
| | | | | 294/1.4 |
| 2015/0102617 A1 | * | 4/2015 | Pluta | E01H 1/1206 |
| | | | | 294/1.4 |
| 2018/0058024 A1 | * | 3/2018 | Griffin | E01H 1/1206 |

FOREIGN PATENT DOCUMENTS

FR          2559350 A1 *  8/1985  .......... A01K 23/005

* cited by examiner

*Primary Examiner* — Gabriela M Puig
(74) *Attorney, Agent, or Firm* — McHale & Slavin, P.A.

(57) ABSTRACT

A dog waste collection device. The device allows a dog owner to place a disposable bag behind a dog to capture dog waste before the waste touches the ground. A collection assembly on the device holds a top edge of a disposable bag in a spaced apart position. Tangs mounted on the collection assembly are used to engage the disposable bag. A shaft slide is used to release the disposable bag without touching the waste or the bag. When the bag is used, movement of a shaft slide on the device will allow the disposable bag to release, bag and all, into a waste receptacle.

4 Claims, 10 Drawing Sheets

DOG WASTE COLLECTION DEVICE

FIELD OF THE INVENTION

The present disclosure relates to the field of pet care, and specifically to a device for the collection and disposal of pet waste.

BACKGROUND OF THE INVENTION

Dog ownership is one of life's great pleasures. Known as man's best friend, dogs provide such joy to the owner, they are often considered part of the family. Young children are taught that the responsibilities associated with dog care become the foundation for parenthood. For the elderly, dogs provide invaluable companionship. In all cases, the responsibilities of dog ownership require care and maintenance. This includes feeding, grooming, exercising, and providing a sanitary area for the dog to eliminate waste.

A responsible dog owner will pick up their dog's waste for proper disposal. However, in many instances, the act may be performed in an area that is difficult to pick up. It does not matter if the dog is a 2 lb. Tea Cup or a 200 lb. Great Dane, disposal of waste is not a pleasurable duty. Some dog owners use a traditional "pooper scooper" for backyard clean up, which is composed of a rake and scoop. Disposal of a dog's waste can provide a unique set of problems, especially if the dog is kept in an area that has few grass areas. In such instances, the owner must be equipped to pick up the waste and dispose of it properly. In many instances, the owners of a dog allow the dog to relieve itself on areas that are not readily cleaned, such as on a city sidewalk. Even if the waste is picked up from the sidewalk, remnants are likely to remain. For instance, city dwellers are known to allow their pets to relieve themselves on a sidewalk. Dog waste removal from a sidewalk is often performed by a dog owner placing their hand in a plastic bag for use as a disposal bag for the waste. The dog owner has to grab the waste in the bag before proper disposal, a disgusting exercise that must be repeated many times during a day.

In many instances, the dog owner may not be inclined to bend over to retrieve the waste. For instance, the dog owner could be elderly, wherein an attempt to bend over could result in back pain, or not even be possible if the owner has lost bending mobility. In other instances, an individual may not have the disposition to retrieve animal waste without becoming ill. For some people with physical limitations, waste removal can be not only annoying but also difficult and/or painful. Further, scoops and the like devices must be cleaned after use to maintain a sanitary condition. Essentially, there are numerous reasons or excuses why dog owners do not pick up their animal waste.

U.S. Pat. No. 9,756,836 discloses a dog waste collection device for holding a disposable bag. A magnet holds a shopping bag, making the device unworkable for collection of waste directly from a dog.

Thus, what is lacking in the industry is a device for collecting dog waste before the waste touches the ground, while allowing the owner to remain in an upright position.

SUMMARY OF THE INVENTION

Disclosed is a dog waste collection device formed from a shaft holding a collection assembly. The device allows a dog owner to place a disposable bag within the collection assembly. The dog owner may then capture dog waste before the waste touches the ground, eliminating additional clean up. The collection assembly holds the top edge of a disposable bag in a spaced apart position. Tangs mounted on the collection assembly are used to engage the disposable bag. The collection assembly is then positioned behind a dog while the dog is relieving itself. When the dog is finished, the collection assembly can be positioned over a waste receptacle for disposal. Movement of a slide handle on the device will allow the disposable bag to release, bag and all, into the waste receptacle without requiring the dog owner to touch the waste or the bag.

An objective of the invention is to disclose an improved waste catching device that avoids the placement of waste on grass or cement.

Another objective of the invention is to disclose a waste catching device having a bag dispenser.

Still another objective of the invention is to disclose a device that eliminates the need for bending over to retrieve dog waste.

Another objective of the invention is to allow a dog owner to collect dog waste and dispose of it without touching the waste or disposable bag.

Yet still another objective of the invention is to provide a dog waste collection device that, unlike a conventional scooper, requires no clean-up after the waste has been collected and disposed of.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
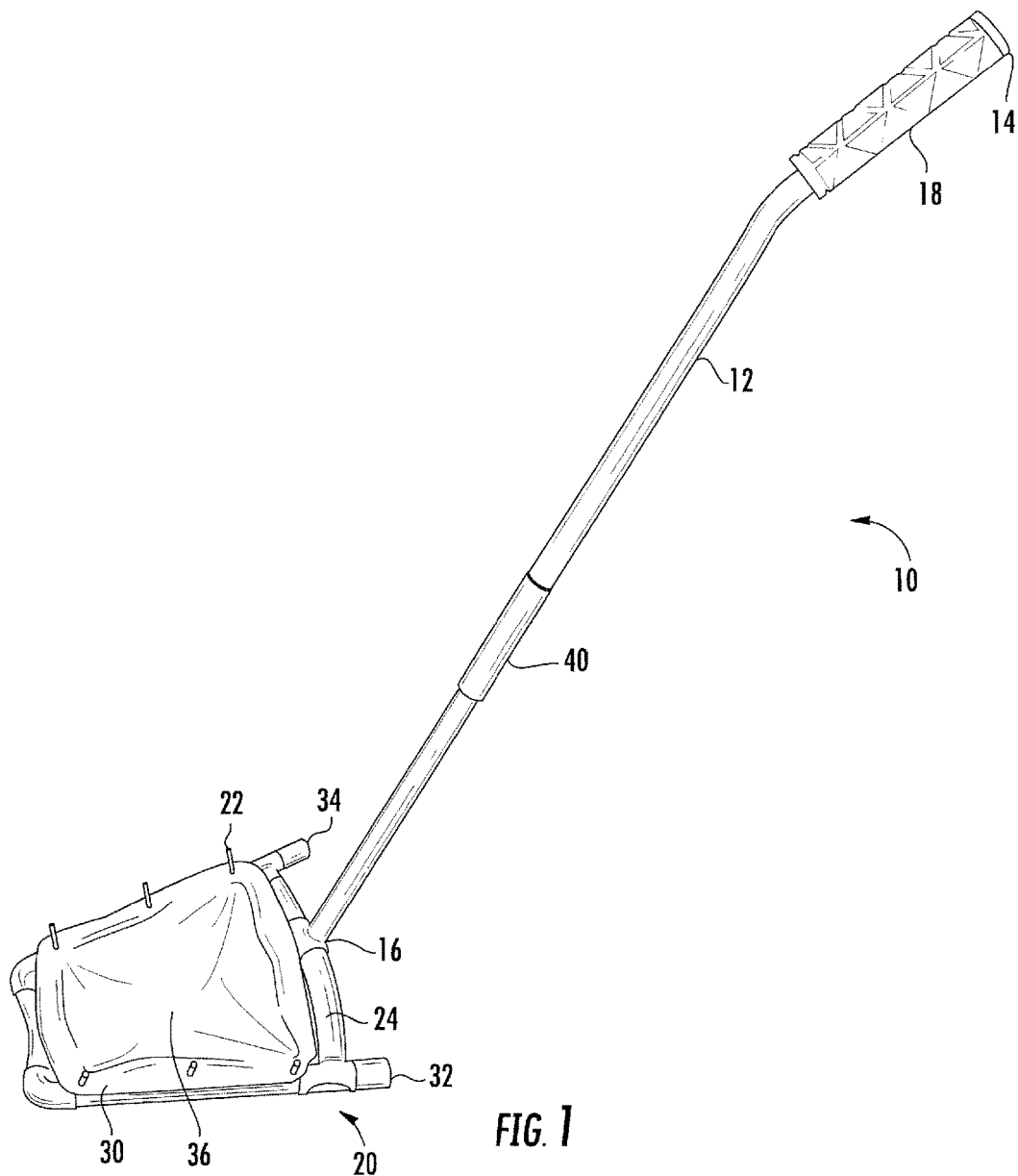
FIG. 1 is a perspective view of the dog waste collection device.
Figure 2:
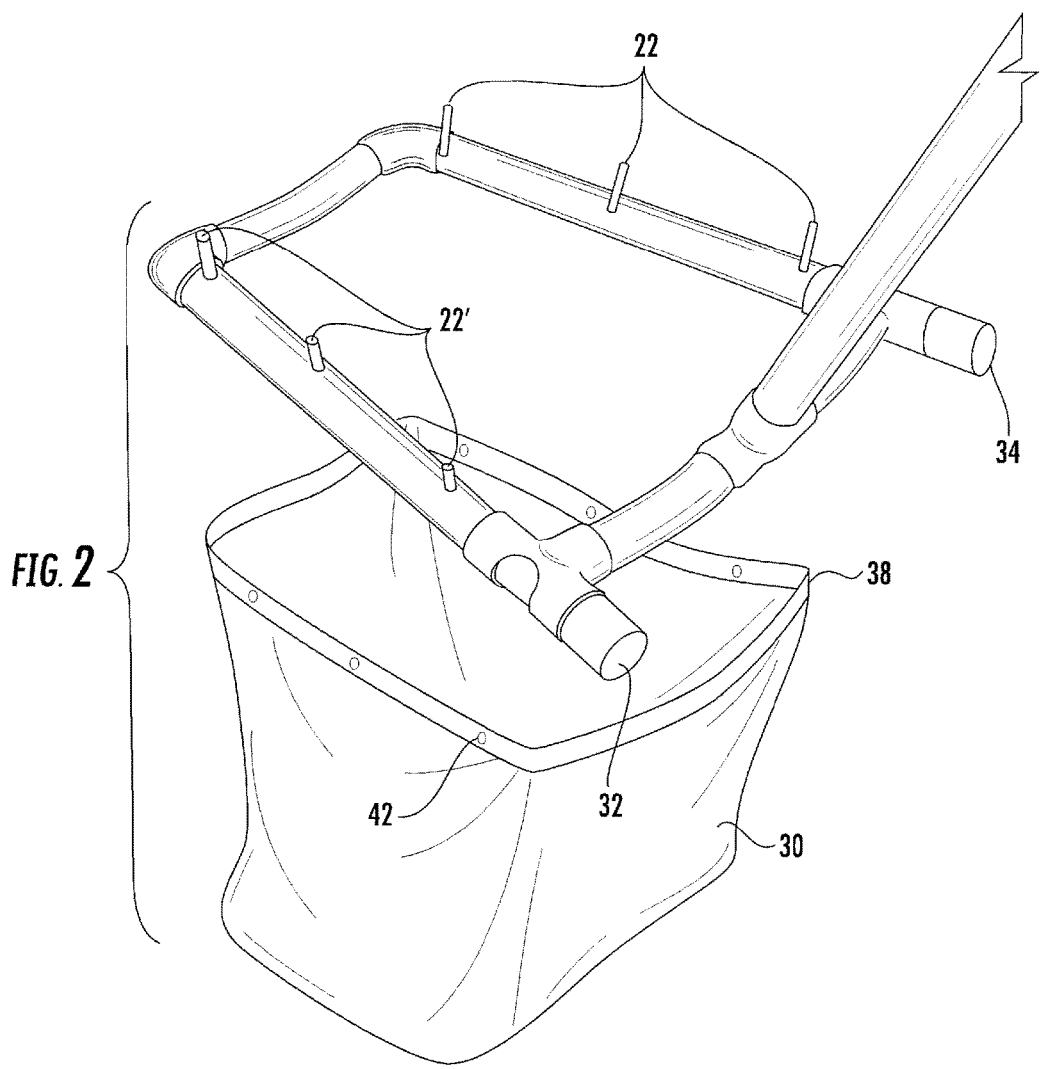
FIG. 2 is an exploded view of the collection assembly and disposable bag.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring now to the figures, set forth is a dog waste collection device 10 having a shaft 12 defined by a proximal end 14 and a distal end 16. The proximal end 14 includes a handle placed in an ergonomic position for a user to hold. The distal end 16 of the shaft 12 is coupled to a collection assembly 20 having a plurality of tangs 22, 22' for securing a disposable bag 30 in a position along an upper surface of the collection assembly. The disposable bag 30 fits between first frame member 32 and second frame member 34, holding the disposable bag 30 in a spaced apart condition and maintaining an open collection area 36. A shaft slide 40 is secured to the shaft 12 and coupled to the tangs 22, 22' by cordage. Movement of the shaft slide 40 toward the proximal end 14 of the shaft 12 will cause rotation of the tangs 22, 22' from a substantially upright facing vertical position to a horizontal position, and then a substantially downward facing vertical position, thereby releasing the disposable bag 30.

The disposable bag 30 has an upper edge 38 with a plurality of apertures 42 constructed and arranged to fit over the tangs 22, 22'. For simplicity in description, all the tangs are enumerated the same, as they all rotate on the second frame member 34 towards the center, and tangs 22' rotate inward on the first frame member 32. Depicted are three tangs per frame member, two or four tangs work equally as well. The tangs 22, 22' engage the apertures 42 on the disposable bag 30. The disposable bag is preferably constructed of a biodegradable material. For example, as the bag is used for collection and immediate disposal, the bag can be formed of a paper product or a biodegradable plastic, or the like material, that may be placed into a compost, or otherwise, does not affect a land fill. In addition, as the waste containment is temporary, a material soluble in water can be used, wherein the waste is disposed of through a conventional toilet. The first and second frame members 32, 34 are preferably PVC tubing, having a hollow center which allows movement of cordage between the tangs and the shaft slide 40.

Figure 3:
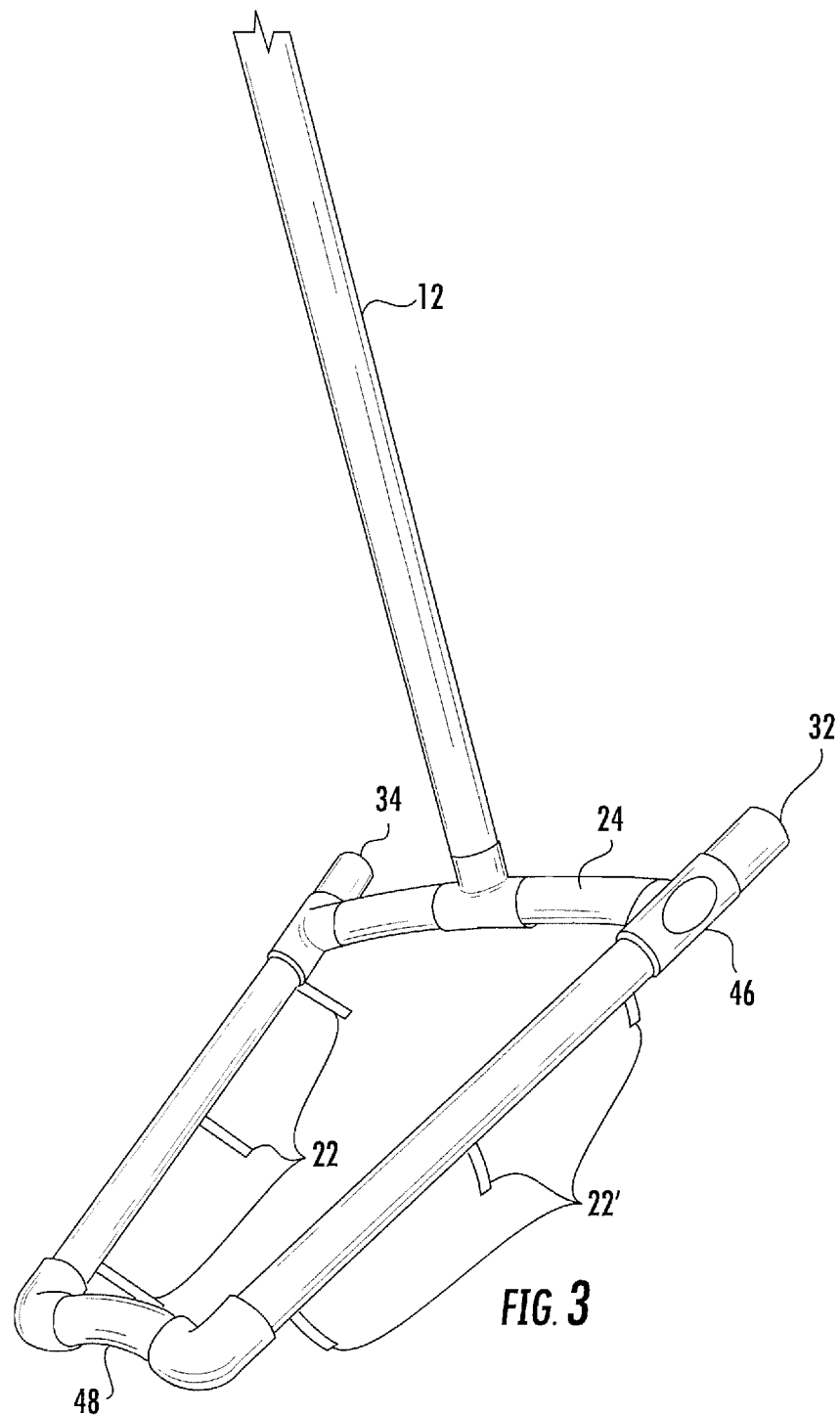
FIG. 3 is a perspective view of the collection assembly.
Figure 4:
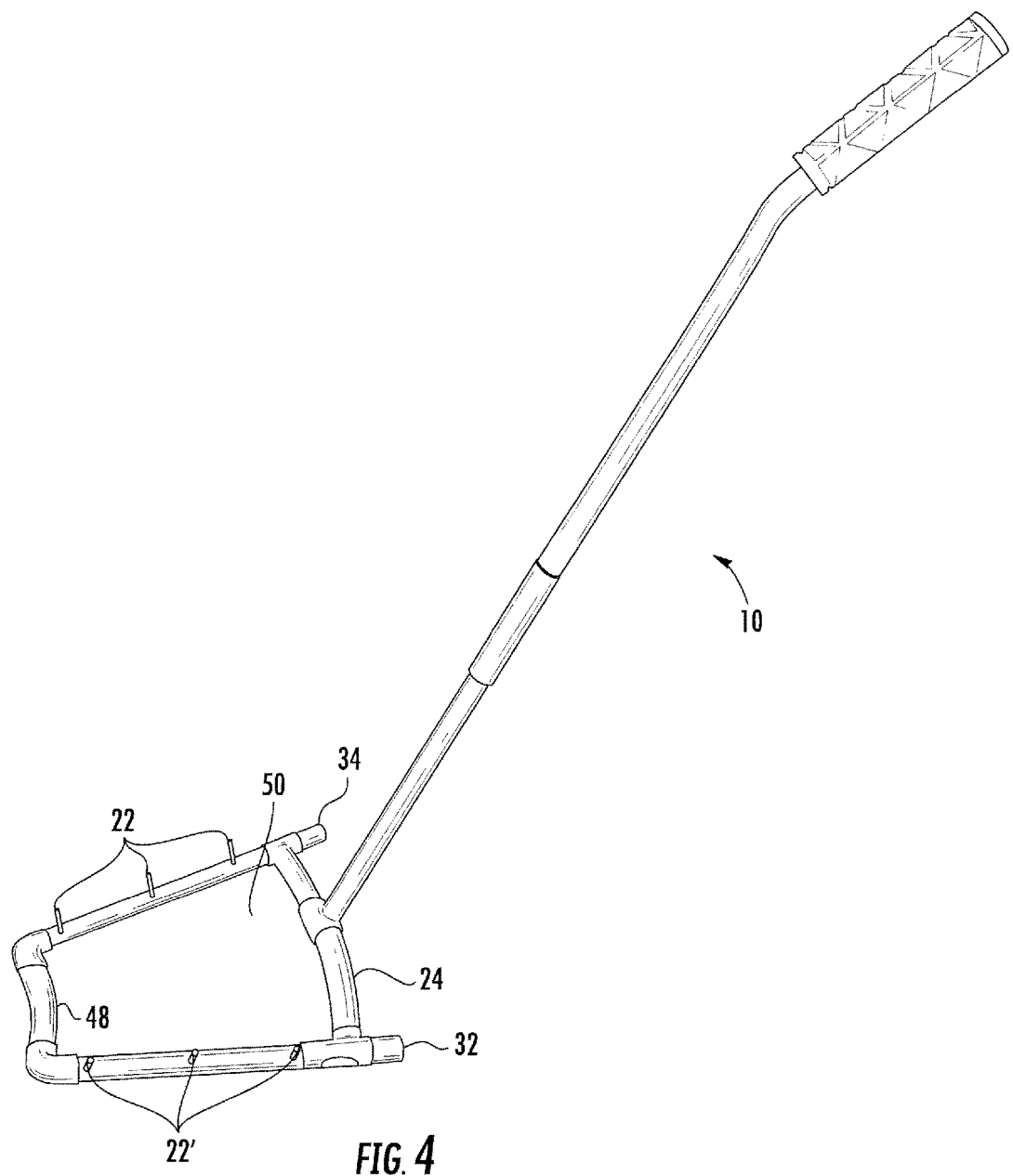
FIG. 4 is a perspective view of the dog waste collection device without a bag.

FIG. 3 depicts the tangs 22 and 22' in a rotated position from the biased upward position, as provided from the upper surface of the rear spacer element 24 to the lower surface 46 of the collection assembly, so as to cause complete release of the disposable bag 30. The rear spacer element 24 and front spacer element 48 can be of equal length or, as illustrated, the front spacer element 48 being of less length than the rear spacer element 24, providing a directional shape to the collection assembly 20. A directional shape has been found to provide ease of placement behind a dog without spooking the dog. FIG. 4 depicts the dog waste collection device 10 without a bag, wherein the tangs 22, 22' are biased in an upward position and available for receipt of the disposable bag within the collection area 50 as defined between first member 32, spaced apart by rear spacer element 24 to the second frame member 34, both of which are spaced apart by frontal spacer element 48. It is noted that the frontal spacer element 48 may include a curvature.

Figure 5:
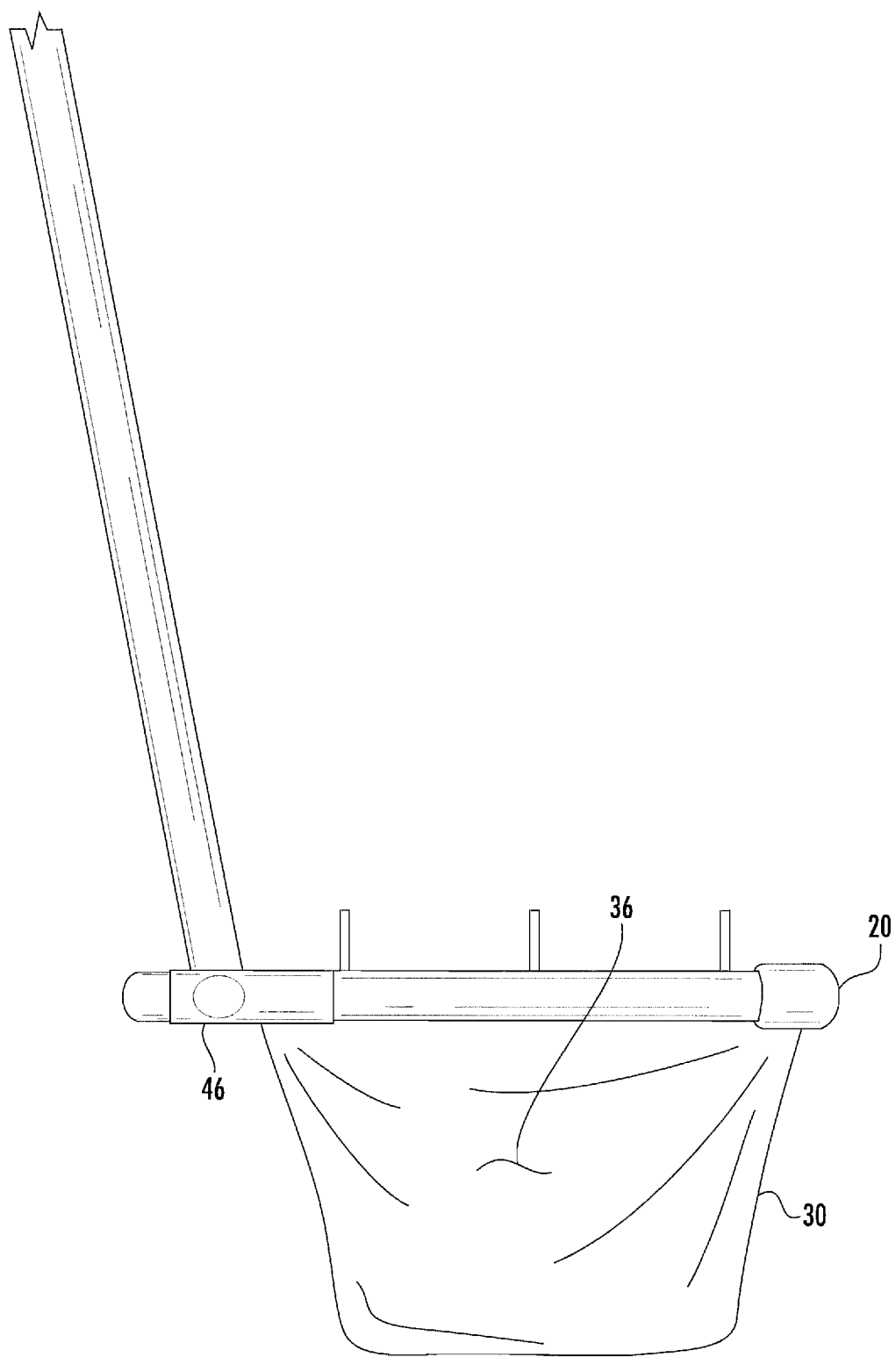
FIG. 5 is a side view of the collection assembly and disposable bag.
Figure 6:
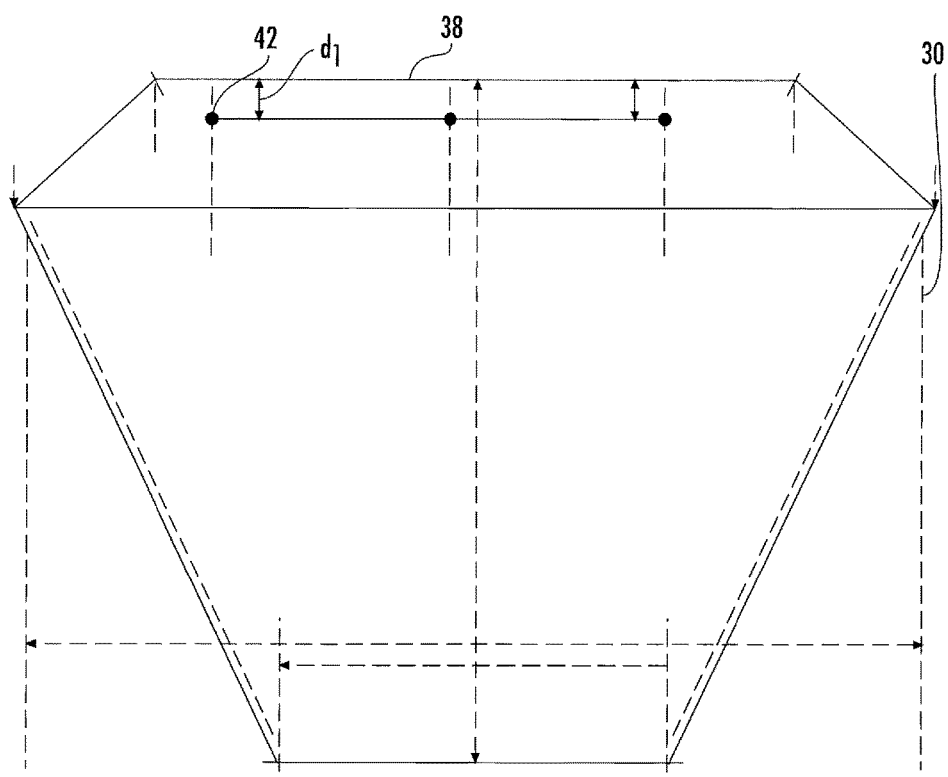
FIG. 6 is a cross-sectional side view of the disposable bag.
Figure 7:
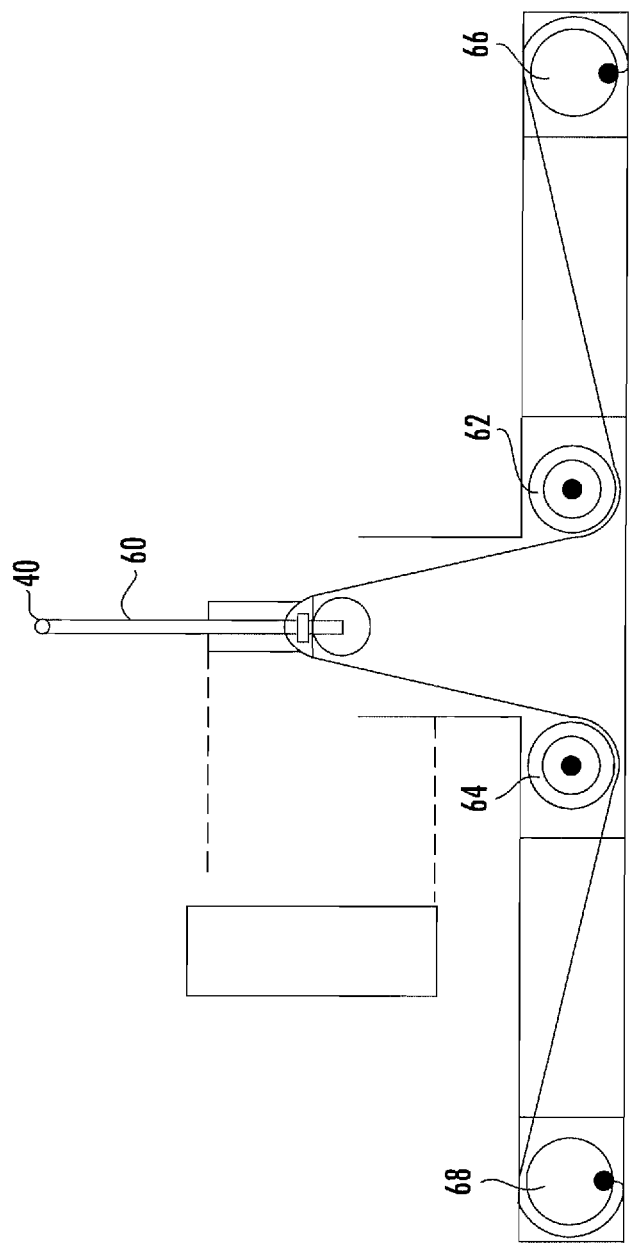
FIG. 7 is a cross-sectional end view of the collection assembly.
Figure 8:
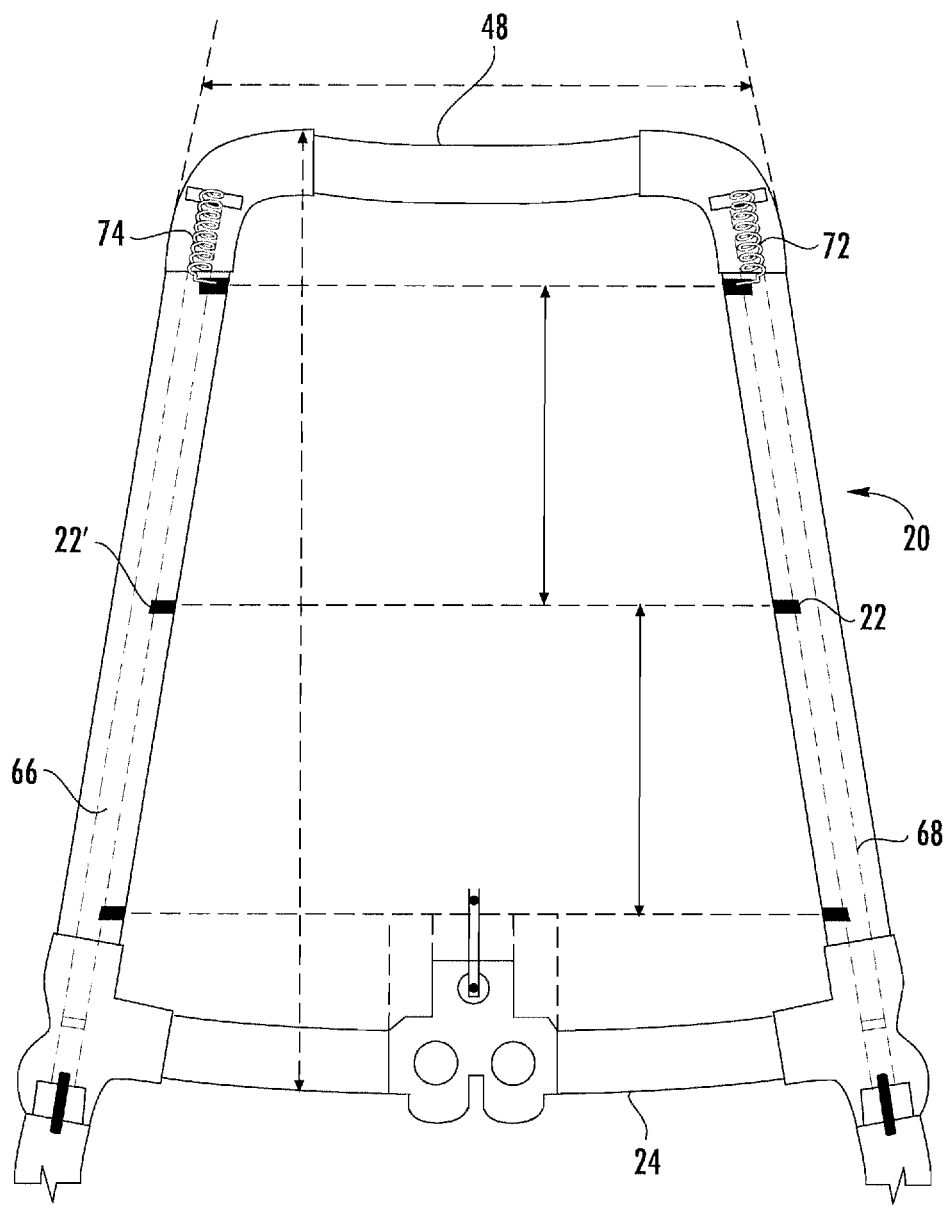
FIG. 8 is a top view of the collection assembly.

As depicted in FIG. 5, the collection assembly 20 allows for the disposable bag 30 to extend from a lower surface 46 of the collection assembly 20, providing a defined catchment area 36, capable of holding feces from even a large dog. The depth of the disposable bag 30 can vary, allowing customized use for small, medium and large dogs. FIG. 6 is a side view of the disposable bag 30 illustrating apertures 42 spaced a distance, $d_1$, from the upper edge 38 of the bag, so as to assure positioning of the disposable bag 30 within the frame of the collection assembly. $D_1$ can be from ⅛ inch to 1 inch from the edge. FIG. 7 depicts a cable or cordage 60 which depends from the shaft slide 40 using pulleys 62 and 64 to allow free movement around a corner and cause rotation of shafts 66 and 68 placed within first frame member 32 and second frame member 34. Upon movement of the shaft slide 40, the cord 60 is pulled upward for uniform movement around pulleys 62 and 64, so as to cause rotation of shafts 66 and 68, resulting in the rotation of tangs 22, 22'. FIG. 8 depicts the collection assembly 20 illustrating shaft location 66 and 68 for rotating of tangs 22 and 22'. The shaft 68 is biased in a position by a spring 72 so as to cause the tangs to remain in an upright facing position. Similarly, spring 74 maintains the shaft 66 in a position wherein tangs 22' are placed in the upright vertical position and available for rotation as previously described.

Figure 9:
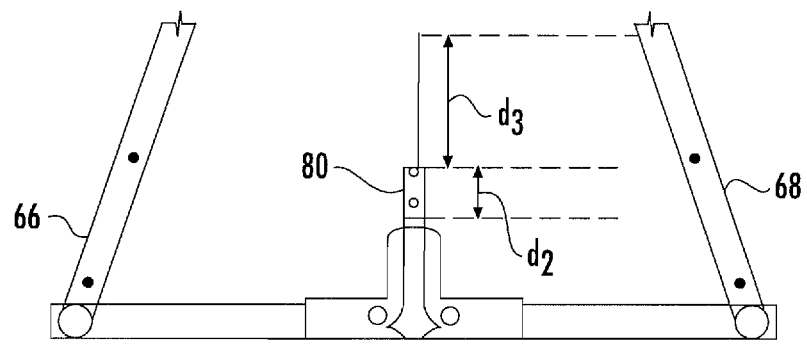
FIG. 9 is a pictorial view illustrating movement of the shaft slide with the collection assembly.
Figure 10:
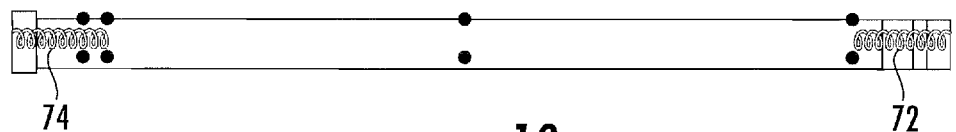
FIG. 10 is an end view of the collection assembly illustrating spring biasing for the tangs.
Figure 11:
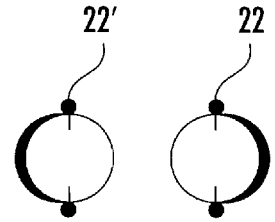
FIG. 11 is a pictorial illustration showing the operational rotation of the tangs from an upper position to a lower position.

Referring to FIG. 9, illustrated is shaft 68 and 66 which are rotatable upon movement of the cord 60, using an adjustment bracket 80 providing spacing, $d_2$, adjustable based upon the length of the cordage, which translates to movement, $d_3$, for direct coupling to the shaft slide 40. Referring to FIG. 10, the springs 72 and 74 are coupled to either the first end or second end of each shaft 66, 68, so as to maintain the shaft in a preferred upright raised position. As depicted by FIG. 11, the tangs 22 and 22' can be rotated from a raised vertical position to a horizontal position, not shown, to a bottom facing position, as depicted.

Figure 12:
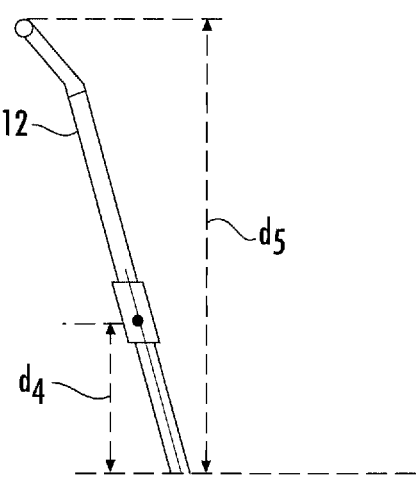
FIG. 12 is a side view of the shaft illustrating movement of the shaft slide.
Figure 13:
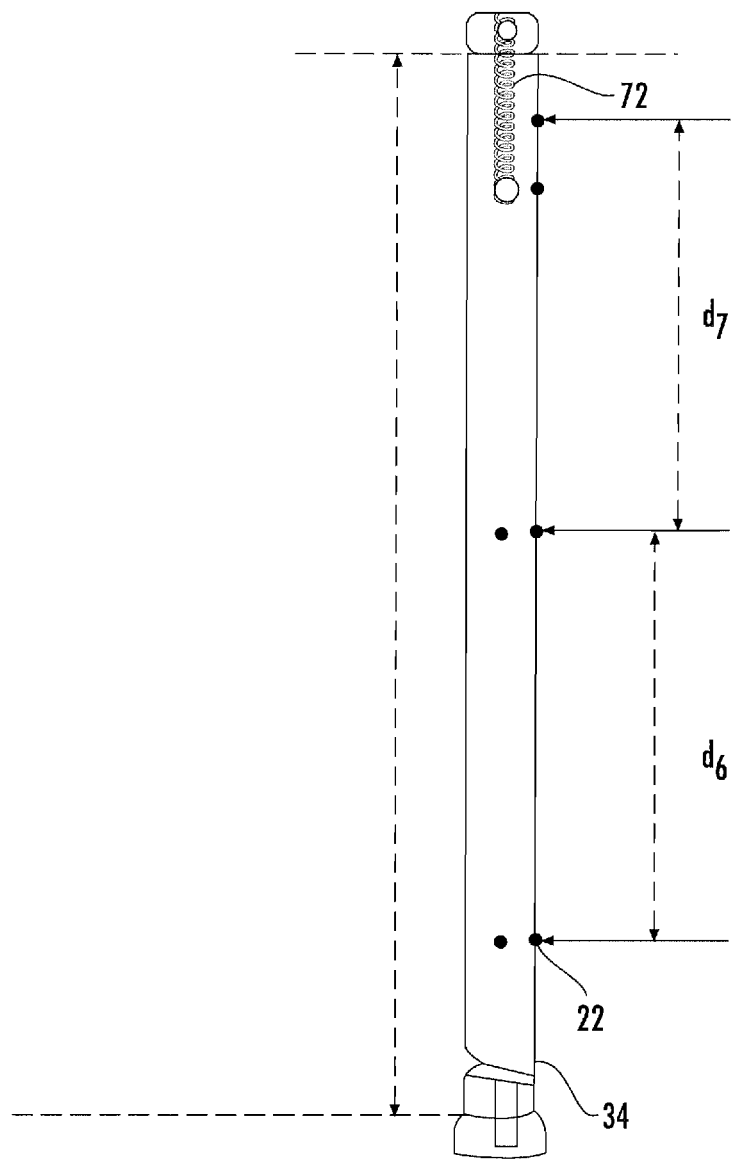
FIG. 13 illustrates a first frame member with the tangs movable from a first position to a second position.

FIG. 12 depicts positioning of the shaft slide 40 a distance, $d_4$, above the collection assembly with the shaft 12 a distance, $d_5$, from the collection assembly. The shaft length, $d_5$, is made of a length for an average person to position the collection assembly beneath a dog without having to bend over or otherwise put the user in an uncomfortable position. FIG. 13 depicts the spring 72 with second frame member 34. The distance, $d_6$ and $d_7$, is between the tangs 22, which are preferably equal, providing proper support of the disposable bag for use.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art, which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A dog waste collection device comprising:
   a shaft having a proximate end and a distal end, said proximate end of said shaft forming a handle for a user to hold;
   a collection assembly secured to said distal end of said shaft, said collection assembly having a plurality of tangs;
   a disposable bag secured to said tangs forming a waste collection area;
   a shaft slide coupled to said plurality of tangs;
   wherein movement of said shaft slide causes rotation of said tangs and release of said bag wherein said tangs are spring biased in an upward position.

2. The dog waste collection device according to claim 1 wherein said collection assembly has a first frame member and a second frame member coupled together by a front spacer member and a rear spacer member to form a circular shape, each said frame member having rotatable tangs constructed and arranged to hold said upper edge of said disposable bag.

3. The dog waste collection device according to claim 1 wherein said shaft slide is coupled to said tangs by a flexible cord, whereby movement of said shaft slide causes said tangs to rotate from a substantially vertical position, used to hold the disposable bag, to a horizontal position, allowing removal of the disposable bag.

4. The dog waste collection device according to claim 1 wherein said disposable bag is a piece of biodegradable material having apertures constructed and arranged to fit over said tangs.

* * * * *